US012711209B2

(12) United States Patent
Chabanne et al.

(10) Patent No.: US 12,711,209 B2
(45) Date of Patent: Aug. 18, 2026

(54) METHOD FOR CONTROLLING ACCESS TO A SITE

(71) Applicant: IDEMIA IDENTITY & SECURITY FRANCE, Courbevoie (FR)

(72) Inventors: Hervé Chabanne, Courbevoie (FR); Vincent Bouatou, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 120 days.

(21) Appl. No.: 18/929,717

(22) Filed: Oct. 29, 2024

(65) Prior Publication Data

US 2025/0200153 A1 Jun. 19, 2025

(30) Foreign Application Priority Data

Dec. 18, 2023 (FR) ...................................... 2314357

(51) Int. Cl.
*G06F 21/31* (2013.01)

(52) U.S. Cl.
CPC .................................... *G06F 21/31* (2013.01)

(58) Field of Classification Search
CPC ..... G06F 21/31; G06F 21/32; H04L 63/0861; H04L 63/102
See application file for complete search history.

(56) References Cited

U.S. PATENT DOCUMENTS 9,721,147 B1 * 8/2017 Kapczynski ......... G06Q 50/265
2013/0259330 A1 * 10/2013 Russo ................ G06V 40/1365 382/115
2018/0176017 A1 6/2018 Rodriguez et al.
2019/0311102 A1 * 10/2019 Tussy ..................... G06V 40/67
2021/0336801 A1 10/2021 Diehl
2023/0231726 A1 7/2023 Diehl

FOREIGN PATENT DOCUMENTS

WO WO 2021/030634 A1 2/2021

OTHER PUBLICATIONS

French Preliminary Search Report issued on Jul. 22, 2024 in FR 2314357 filed on Dec. 18, 2023, 9 pages (with Written Opinion).

* cited by examiner

*Primary Examiner* — Benjamin A Kaplan
(74) *Attorney, Agent, or Firm* — Oblon, McClelland, Maier & Neustadt, L.L.P.

(57) ABSTRACT

A computer-implemented method for controlling access to a site, comprising an enrollment phase and a control phase. The enrollment phase produces a signed enrollment hash based on enrollment data, and the hash is delivered to the sender of the enrollment data. The control phase produces a result indicating whether requested access to the site should be accepted, based on proof data comprising a proof hash in the form of a signed enrollment hash.

15 Claims, 6 Drawing Sheets

[Fig. 1]
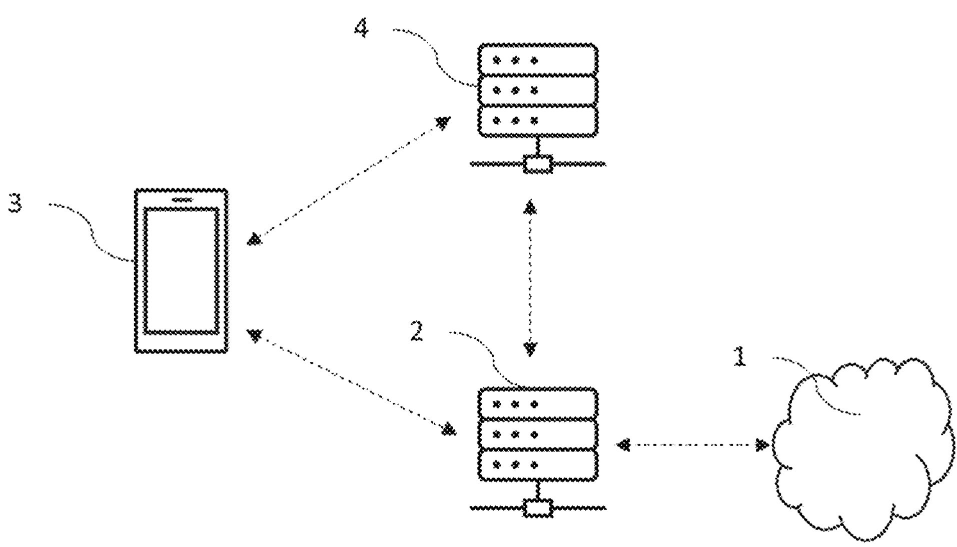

[Fig. 2]
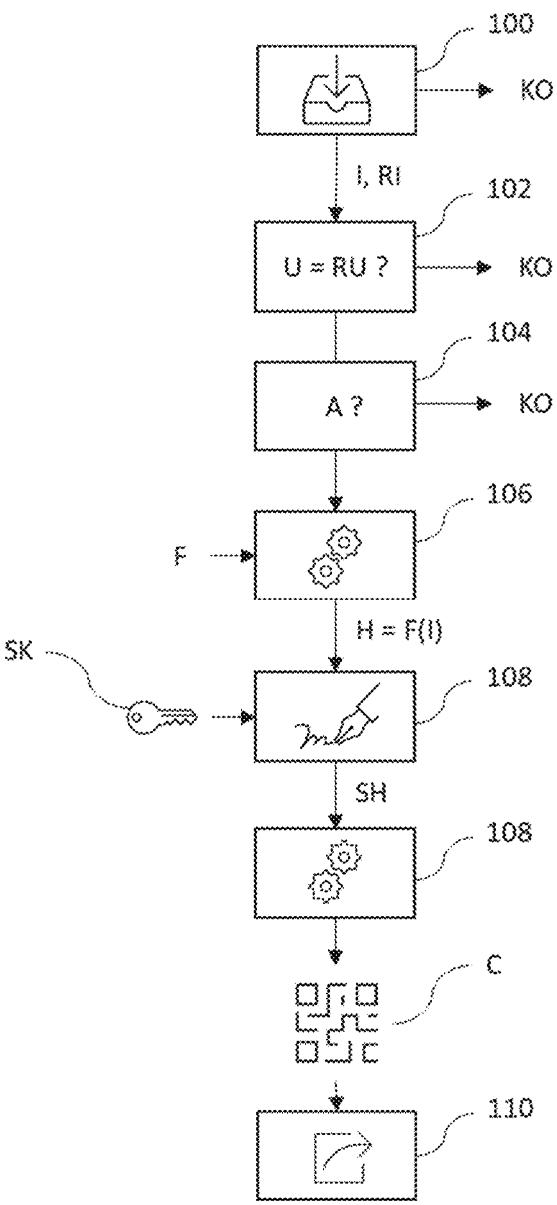
[Fig. 3]
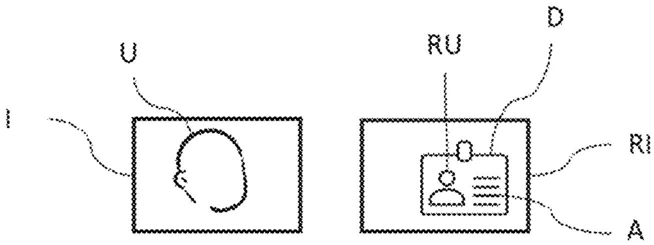

[Fig. 4]
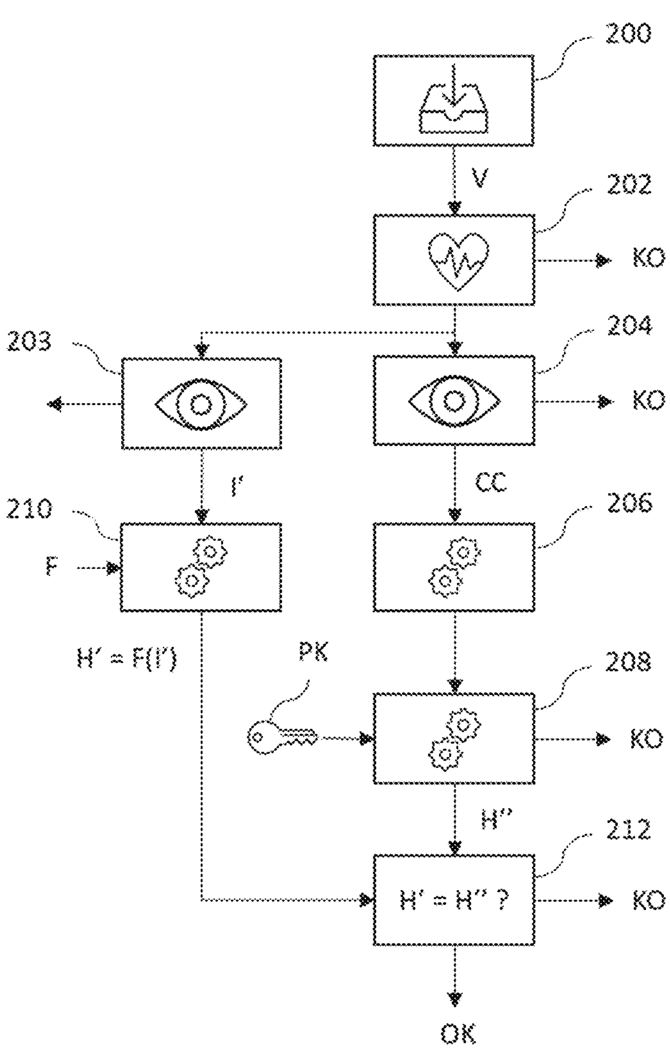
[Fig. 5]
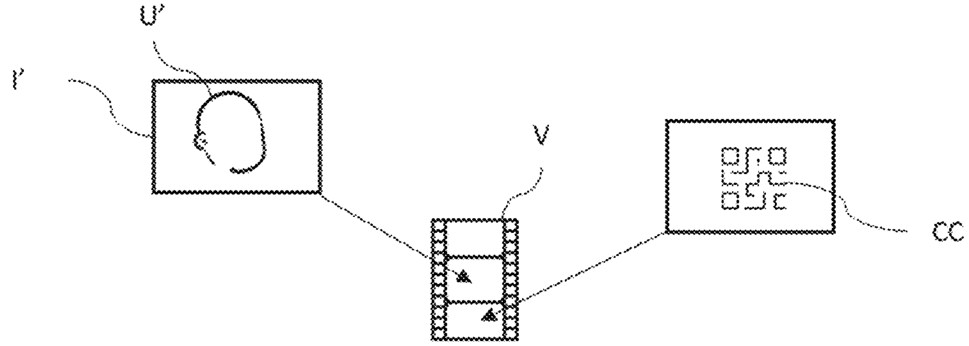

[Fig. 6]
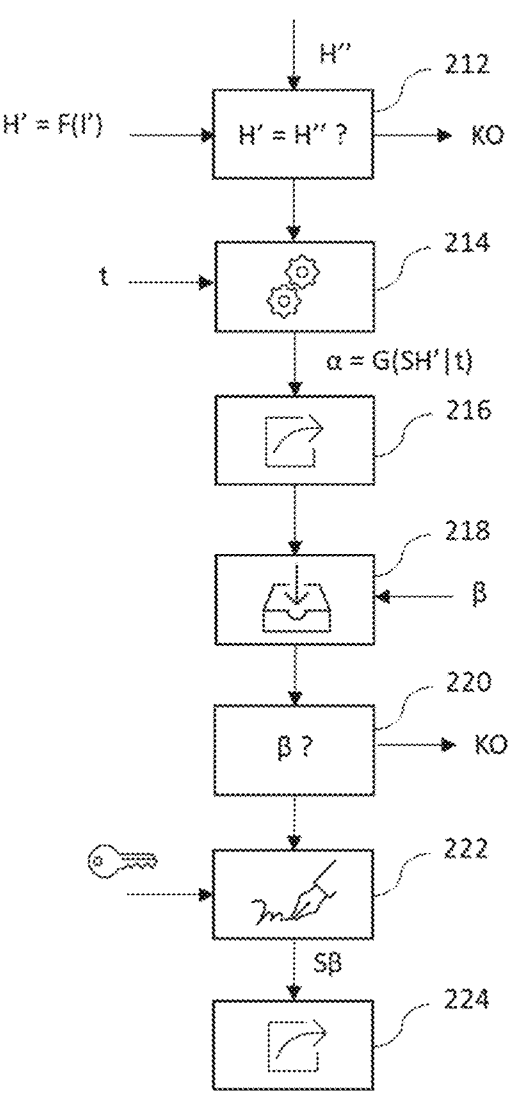

[Fig. 7]
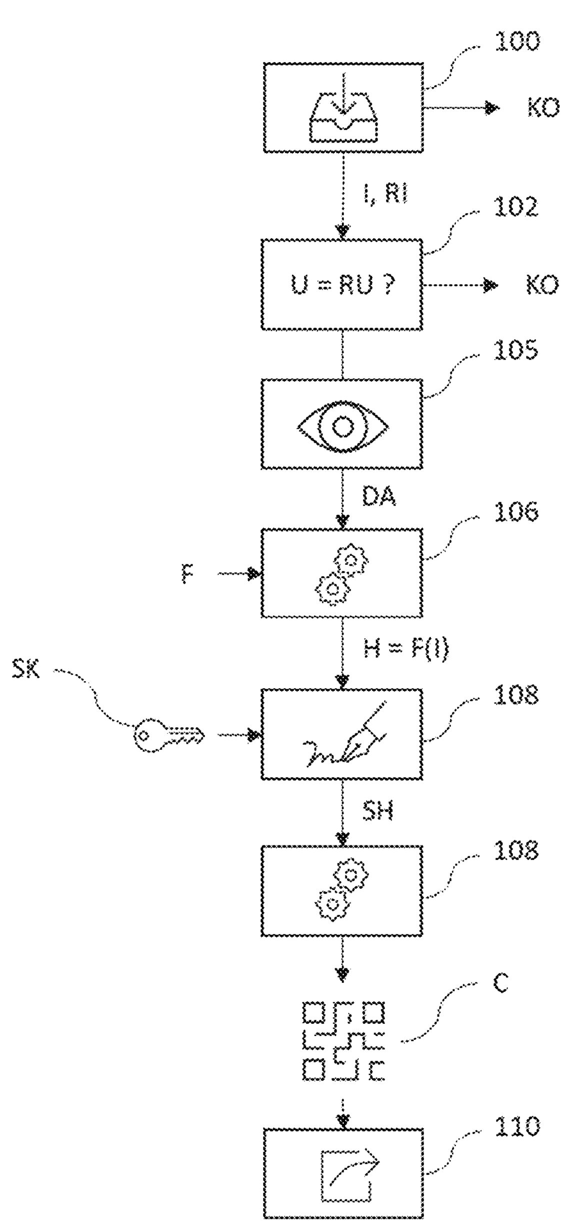

[Fig. 8]
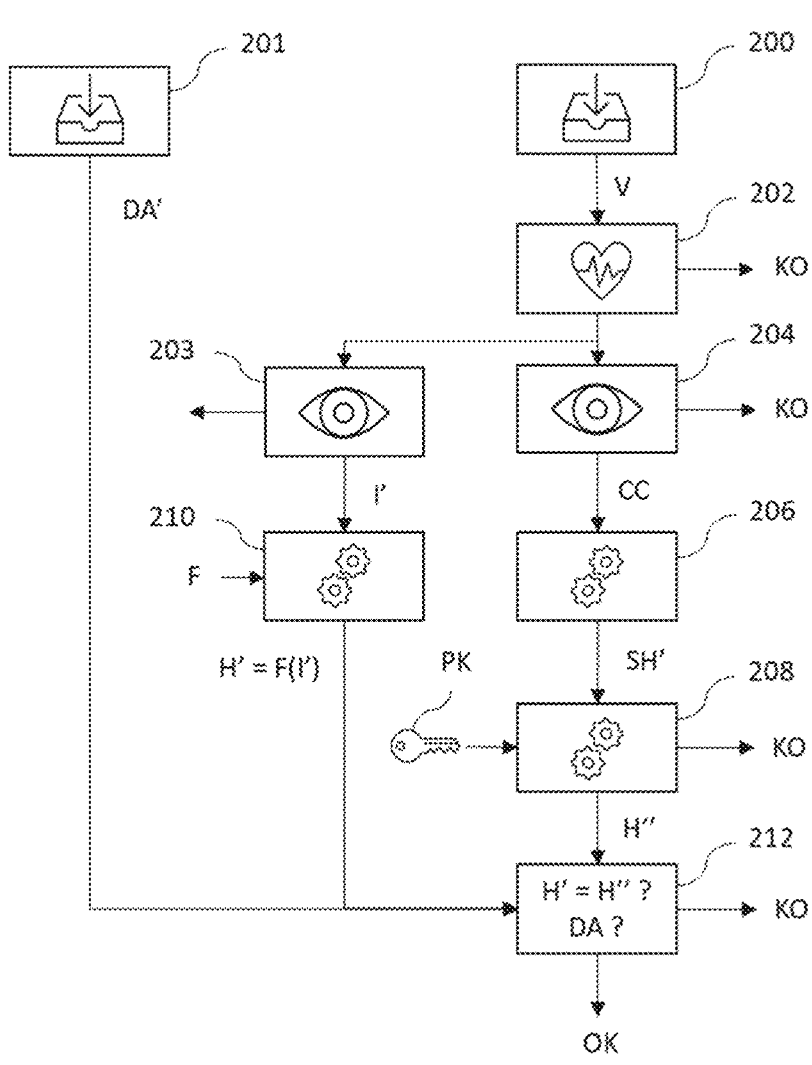

METHOD FOR CONTROLLING ACCESS TO A SITE

FIELD OF THE INVENTION

The present invention relates to a method for controlling access to a site.

PRIOR ART

Some websites have content or provide services to which certain categories of user are not supposed to have access. For example, minors are not supposed to access sites the content of which is reserved for adults.

Some adult websites prompt Internet users to confirm that they are of legal age by clicking a button to this effect.

This protection is not satisfactory, because it does not prevent a motivated minor from accessing adult content by clicking this button anyway.

DESCRIPTION OF THE INVENTION

One aim of the invention is to more securely control access to a site that only one category of person has the right to access.

This aim is achieved by way of a first method for controlling access to a site or by way of a second method for controlling access to a site, constituting an alternative to the first method. The two methods are computer-implemented.

The first method comprises:

- an enrollment phase, comprising steps of:
  - obtaining enrollment data comprising:
    - an enrollment image showing an individual to be enrolled,
    - a reference image showing:
      - a photograph located on an identity document, the photograph showing a reference individual,
      - information located on the identity document and relating to the reference individual,
  - checking for a match between the individual to be enrolled and the reference individual based on the enrollment image and on the reference image,
  - analyzing the information shown in the reference image so as to determine whether or not the information satisfies a condition for accessing the site,
  - applying a hash function to the enrollment image so as to produce an enrollment hash,
  - digitally signing the enrollment hash using a private key, so as to produce a signed enrollment hash,
  - implementing measures with a view to communicating the signed enrollment hash to a sender of the enrollment data,
  - wherein at least one step from among applying the hash function, digitally signing and implementing the measures is carried out only if the following conditions are met:
    - the check reveals that the individual to be enrolled and the reference individual match, and.
    - the analysis reveals that the information satisfies the condition for accessing the site,
- a control phase, comprising steps of:
  - obtaining proof data comprising:
    - a proof image showing an individual to be inspected, and
    - a signed proof hash,

- using a public key forming an asymmetric key pair with the private key, checking the signature of the signed proof hash,
  - applying the hash function to the proof image so as to produce another proof hash,
  - checking for a match between the signed proof hash and the other proof hash,
  - generating an inspection result indicating that:
    - a sender of the proof data has the right to access the site, only if the following conditions are met:
      - the signature check reveals that the signed proof hash has been signed with the private key,
      - the check for a match reveals that the signed proof hash and the other proof hash match,
    - otherwise, the sender of the proof data does not have the right to access the site.

In the first method, the signed enrollment hash constitutes proof of the fact that the individual to be enrolled does indeed satisfy the condition for accessing the site. In particular, the fact that this hash has been signed by a private key makes it possible to certify that this hash was indeed produced in the enrollment phase by an approved trusted authority.

If the individual to be inspected in the control phase (shown in the proof image) is an individual who has previously been enrolled in the enrollment phase, this implies that this individual normally has a signed enrollment hash generated based on an image that shows this same individual (the enrollment image). This individual may thus provide their signed enrollment hash as a signed proof hash. Since the control phase reuses the same hash function as that used in the enrollment phase, as well as a public key that forms an asymmetric key pair with the private key used to sign the enrollment hash, it may be deduced that the signed proof hash is the signed enrollment hash. Thus, a user who has successfully completed the enrollment phase is logically granted access to the site. It is difficult for an attacker who does not comply with the access condition to deceive the proposed method. Indeed, the attacker has to successfully complete the enrollment phase and the control phase, this involving having to procure the identity document of a third party who meets the access condition and also find a photograph of the same third party.

One advantage of the first proposed method lies in the fact that the identity document is used only in the enrollment phase and not in the control phase. This separation allows the method to be implemented without the identity document being provided to the entity that carries out the control phase. Moreover, the identity document is used only once at enrollment; the control phase may then be carried out multiple times for the same user to be inspected, without said user having to provide their identity document. In fact, the enrollment image is used in the first method as a kind of provisional identity document, the signed enrollment hash making it possible to attest that the individual whose face appears in the enrollment image meets the required access condition.

The second method comprises:

- an enrollment phase, comprising steps of:
  - obtaining enrollment data comprising:
    - an enrollment image showing an individual to be enrolled,
    - a reference image showing:
      - a photograph located on an identity document, the photograph showing a reference individual,
      - information located on the identity document and relating to the reference individual, checking for a match between the individual to be enrolled and the reference individual based on the enrollment image and on the reference image, generating an enrollment attribute that contains the information shown in the reference image, applying a hash function to the enrollment image so as to produce an enrollment hash, digitally signing the enrollment hash using a private key, so as to produce a signed enrollment hash, marking the enrollment attribute using a marking key, so as to produce a marked enrollment attribute, implementing measures with a view to communicating the signed enrollment hash and the attribute to a sender of the enrollment data, wherein at least one step from among generating the enrollment attribute, applying the hash function, digitally signing, marking and implementing the measures is carried out only if the individual to be enrolled and the reference individual match, a control phase, comprising steps of:

obtaining proof data comprising:

a proof image showing an individual to be inspected, and a signed proof hash, a marked proof attribute, using a public key forming an asymmetric key pair with the private key, checking the signature of the signed proof hash, applying, to the marked proof attribute, a processing operation complementary to the marking in order to deduce whether or not the marked proof attribute has been marked with the marking key, applying the hash function to the proof image so as to produce another proof hash, checking for a match between the signed proof hash and the other proof hash, checking the marked proof attribute so as to determine whether or not the marked proof attribute contains information that satisfies a condition for accessing the site, generating an inspection result indicating that:

a sender of the proof data has the right to access the site, only if the following conditions are met:

the signature check reveals that the signed proof hash has been signed with the private key, the complementary processing operation reveals that the marked proof attribute has been marked using the marking key, the check on the marked proof attribute reveals that the marked proof attribute contains information that satisfies the condition for accessing the site, and the check for a match reveals that the signed proof hash and the other proof hash match, otherwise, the sender of the proof data does not have the right to access the site.

The second method differs from the first method in that the condition for accessing the site is evaluated not in the enrollment phase, but in the control phase. This second method has the advantage of a certain degree of flexibility. Indeed, at the end of the enrollment phase, various control phases may be implemented for various sites imposing different access conditions.

The first method or the second method may furthermore comprise the following optional features, taken individually or in combination when technically possible.

In one embodiment, the marking is an encryption and the complementary processing operation is a decryption. In another embodiment, the marking is a digital signature and the complementary processing operation is a digital signature check.

Optionally, the hashing is perceptual hashing.

Optionally, the measures comprise generating an enrollment barcode representing the signed enrollment hash.

Optionally, the proof data comprise a proof video, and the control phase comprises the following steps: checking for the presence of a living individual in the proof video, and if a living individual is present in the proof video, obtaining the proof image from the proof video.

Optionally, the control phase comprises checking for a match between the living individual and the individual to be inspected based on the proof image, wherein the generated inspection result indicates that the sender of the proof data does not have the right to access the site if the living individual and the individual to be inspected do not match.

Optionally, the control phase furthermore comprises a step of detecting, in the proof video, a proof barcode representing the signed proof hash.

Optionally, the control phase is implemented by a control server, and if the inspection result indicates that the sender of the proof data has the right to access the site, the inspection result is transmitted to a site access server separate from the control server, such that the site access server accepts a site access request from the sender of the proof data.

Optionally, the proof data are obtained by the control server without going via the access server.

Optionally, the control phase comprises the following steps:

hashing a datum dependent on the signed proof hash and a variable value, so as to produce a fingerprint, sending the fingerprint to the site access server;

receiving a challenge datum generated by the site access server based on the fingerprint, determining whether or not the challenge datum satisfies a validity condition, if the challenge datum satisfies the validity condition, digitally signing the challenge datum using a second private key, so as to produce a signed challenge datum, if the inspection result indicates that the sender of the proof data has the right to access the site, sending the signed challenge datum to the access server, the access server being configured to:

check the validity of the signed challenge datum using a second public key, the second private key and the second public key forming a second asymmetric key pair, if the signed challenge datum is found to be valid, accepting a site access request from the sender of the proof data.

Optionally, the variable is a temporal variable.

Optionally, the access server is configured to generate the challenge datum by applying a verifiable random function to the fingerprint.

Optionally, the condition for accessing the site comprises an age condition, for example a legal age condition.

Another subject of the present disclosure is a computer program product comprising program code instructions for carrying out the steps of the first method or of the second method when this program is executed by at least one processor.

DESCRIPTION OF THE FIGURES

Further features, aims and advantages of the invention will become apparent from the following description, which is purely illustrative and non-limiting, and which should be read with reference to the appended drawings, in which:

FIG. 1 schematically illustrates a client device, a site, and servers used to control access to the site by the client device.

FIG. 2 is a flowchart of steps of an enrollment phase according to a first embodiment.

FIG. 3 schematically shows enrollment data according to one embodiment.

FIG. 4 is a flowchart of steps of a control phase according to a first embodiment.

FIG. 5 schematically shows proof data according to one embodiment.

FIG. 6 is a flowchart of optional steps of a control phase according to the first embodiment.

FIG. 7 is a flowchart of steps of an enrollment phase according to a second embodiment.

FIG. 8 is a flowchart of optional steps of a control phase according to the second embodiment.

In all of the figures, elements that are similar have been designated by identical references.

DETAILED DESCRIPTION OF THE INVENTION

1) System

FIG. 1 shows a site 1, an access server 2 for accessing the site 1, a client device 3 (more simply called "client 3" hereinafter), and a control server 4.

In the following, it will be assumed that the site 1 is a website, it being understood that the site 1 may be a physical site.

The access server 2 comprises a communication interface for communicating with the client 3 and with the control server 4 via a network or multiple different networks. The communication interface is of any type, wired (Ethernet) or wireless radio (Wi-Fi, Bluetooth, cellular, etc.).

The site access server 2 furthermore comprises a processor configured to implement steps that will be described hereinafter. The processor may comprise one core or multiple cores (to execute different tasks simultaneously). The processor may be of any type: CPU, GPU, programmable circuit (FPGA) or non-programmable circuit (ASIC).

The site access server 2 furthermore comprises a memory storing a program comprising code instructions able to be executed by the processor. The abovementioned steps are implemented when this program is executed by the processor. The memory is of any type: volatile (RAM) or non-volatile (flash, HDD, SSD, EEPROM, etc.).

In particular, the access server 2 may host the website 1, that is to say the pages of the website may be stored in the memory of the access server 2, and the program executed by the processor of the access server 2 may comprise the code of the website.

The client 3 is a user terminal capable of asking the access server 2 for access to the website 1. It is of any type (desktop computer, laptop computer, tablet, smartphone, etc.). The client 3 comprises a camera.

The website 1 is not freely accessible. This is understood to mean that the website 1 comprises at least one page access to which for a user of the client device 3 is conditional on compliance with a predefined access condition.

A description will be given below of one non-limiting embodiment in which the condition for accessing the site comprises an age condition, it being understood that alternative or additional conditions are conceivable (for example an address, gender, nationality, etc. condition). For example, a page of the site 1 comprises content reserved for adults; in this context, the user of the client device 3 should be able to access this page only if they are of legal age (legal age being for example 18 years old in France).

One function provided by the access server 2 is that of enforcing the condition for accessing the site 1, by accepting or refusing site access requests, depending on whether or not this condition is met.

The control server 4 has the function of evaluating whether or not the site access condition is met by a user, such that the access server 2 is able to take appropriate measures (accept or refuse an access request).

The control server 4 comprises a communication interface for communicating with the site access server 2 via a network. The information provided above regarding the communication interface of the access server 2 is applicable to the communication interface of the control server 4.

The control server 4 furthermore comprises a processor configured to implement steps that will be described hereinafter. The information provided above regarding the processor of the access server 2 is applicable to the processor of the control server 4.

The control server 4 furthermore comprises a memory storing a program comprising code instructions able to be executed by the processor. The abovementioned steps are implemented when this program is executed by the processor. The information provided above regarding the memory of the access server 2 is applicable to the processor of the control server 4.

The memory of the control server 4 stores a hash function F.

Preferably, the hash function F is a perceptual hash function. Perceptual hashing has the following advantageous property: two similar images subjected to the same perceptual hash function lead to two hashes having close values, while two highly different images subjected to the same perceptual hash function lead to two hashes having values far apart from one another.

The memory of the control server 4 also stores a private key SK and a public key PK that together form an asymmetric key pair. As will be seen hereinafter, one function provided by the private key SK is that of signing data, so as to certify that these data have been enrolled by the control server. One function provided by the public key PK is that of checking whether data have been signed by the control server using its private key SK.

2) Access Control Method (First Embodiment)

A description will now be given of a method implemented by the control server 4, in collaboration with the site access server 2, for controlling access to the site 1 as requested by the client 3.

The sending of data between the client 3, the access server 2 and the control server 4 will be discussed below. Unless explicitly stated otherwise, these sending operations are network-based and carried out by way of the respective communication interfaces of these devices.

Processing operations carried out by the access server 2 and the control server 4 will also be discussed. It will be understood that these processing operations are implicitly implemented by the respective processors of these devices.

The method comprises two phases: an enrollment phase and a control phase.

a) Enrollment Phase

It will be assumed that the control server 4 detects that a user of the client 3 asks to be enrolled therewith.

A description will be given below of one embodiment of the enrollment phase in which the client 3 and the control server 4 communicate via a network, via their respective communication interfaces. In this embodiment, the control server 4 detects an enrollment request sent by the client 3 via its network communication interface.

The control server 4 prompts the client 3 to provide enrollment data thereto via an appropriate message. The expected enrollment data comprise two images, which are conventionally called an "enrollment image" and a "reference image" in the present disclosure.

More specifically, the control server 4 prompts the client 3 to provide thereto:

- an enrollment image showing the individual to be enrolled (typically the user of the client 3),
- a reference image showing an identity document of this individual to be enrolled, such that the reference image shows a photograph of the individual to be enrolled that is located on the identity document, and also information based on which it may be deduced whether the user to be enrolled satisfies the access condition.

In our non-limiting example of an access condition based on the age of the user, the expected information typically comprises a date of birth.

In a step 100, the control server 4 receives enrollment data from the client 3 that are supposed to have the above content.

In one embodiment, the reference image and the enrollment image are acquired by the camera of the client 3. In particular, the enrollment image may show a photograph presented on a physical medium (for example paper or a display screen), this photograph itself showing the individual to be enrolled. This photograph may be separate from the photograph of the identity document.

In another embodiment, the enrollment image and the reference image are digital images stored in a memory of the client 3, and these digital images are uploaded to the control server 4 at the initiative of the user of the client 3, via the communication interface of the client.

In step 100, the control server 4 may check that the enrollment data do indeed have the expected content. If they do not, the processor ends the enrollment phase, for example by returning a result "NOK" to the client 3, indicating that the enrollment has failed. If they do, the processor moves to step 102.

FIG. 3 shows enrollment data having the format expected by the control server 4. These enrollment data comprise:

- an enrollment image I showing an individual U, who is conventionally called an "individual to be enrolled",
- a reference image RI showing:
  - a photograph located on an identity document D, the photograph showing an individual RU, who is conventionally called a "reference individual",
  - information A also located on the identity document, this information A relating to the reference individual RU.

The identity document D is for example a national identity card, a passport or a driving license.

Returning to FIG. 2, the control server 4, in a step 102, checks for a biometric match between the individual U to be enrolled and the reference individual RU, based on the enrollment image I and the reference image RI. During this step 102, the control server 4 carries out for example facial recognition in these two images I and RI, and applies a processing operation of biometrically comparing faces recognized in the two images R and RI, this comparison processing operation being known to those skilled in the art. This comparison processing operation may in particular consider that the reference individual and the individual to be enrolled match if and only if a metric representative of a distance between the faces recognized in the images I and RI is less than a predefined threshold.

If the control server 4 considers that the individual U to be enrolled and the reference individual RU do not match, the control server ends the enrollment phase.

If the individual U to be enrolled and the reference individual RU match, the control server 4 moves to an analysis step 104.

In the analysis step 104, the control server 4 analyzes the information A located on the identity document as shown in the reference image RI, so as to determine whether or not the reference individual satisfies the predefined access condition.

In our non-limiting embodiment in which the access condition comprises an age condition, the analysis step may comprise detecting a date of birth indicated on the identity document shown in the reference image, calculating the current age of the reference individual RU based on the date of birth, and checking whether the calculated current age is greater than or equal to a minimum age required to access the site (for example 18 years old).

If the analysis of the information A reveals that the reference individual does not satisfy the predefined condition (in our example: calculated age<required minimum age), then the control server ends the enrollment phase.

If the analysis of the information A reveals that the reference individual satisfies the predefined condition (in our example: calculated age>required minimum age), the control server, in a step 106, applies the hash function F discussed above to the enrollment image I so as to produce an enrollment hash H. This therefore gives: H=F(I). The hash is a number the base-2 representation of which is a binary word.

In a step 108, the control server 4 digitally signs the enrollment hash H using the private key SK, so as to produce a signed enrollment hash SH. SH is another number the base-2 representation of which is another binary word.

The signed enrollment hash comprises for example the enrollment hash H (which is therefore unsigned) and a digital signature generated in step 108. In particular, the signed enrollment hash may result from a concatenation of the enrollment hash H and of this digital signature generated in step 108.

The enrollment hash signed by the server 4 is representative of the fact that the control server 4 accepts that the user U meets the predefined condition, and therefore that this user U may subsequently have the right to access the website 1.

Next, the control server 4 implements measures (steps 110) with a view to communicating the signed enrollment hash SH to a sender of the enrollment data (this sender being the client 3 or else its user).

Preferably, these measures comprise generating a barcode C representing the signed enrollment hash SH. The barcode C may be one-dimensional or else two-dimensional. If it is two-dimensional, the barcode may in particular be what is known as a "quick-response" code (more often called a "QR code"), as illustrated in FIG. 3, or may be a flashcode or else a "2D-Doc" barcode.

The abovementioned measures may also comprise sending the barcode C to the client device 3 via the communication interface of the control server 4. In this embodiment, the barcode is transmitted in the form of a digital datum via a communication network.

It will be seen hereinafter that the user U will then be able to submit the barcode C as proof of their enrolled status (and therefore implicitly as proof of the fact that they meet the predefined condition for accessing the website 1).

Until now, it has been assumed that the client 3 and the control server dialog during the enrollment phase using their respective communication interfaces. However, in another embodiment, the user of the client 3 and the control server dialog by post:

- The user of the client 3 sends paper photocopies of the enrollment image and of the reference image by post, and these paper photocopies may then be digitized so as to allow the control server 4 to obtain the enrollment image and the reference image.
- The processor of the control server 4 may order printing of the barcode C on a medium (for example a paper medium). This medium may then be communicated to the user of the client device 3 by post, this assuming that the user has informed the control server 4 of their postal address in some way.

It has been seen above that some steps of the enrollment phase are conditional on tests: the analysis step 104 is implemented only if there is a match between the individual to be enrolled and the reference individual, and step 106 of applying the hash function is implemented only if the analysis of the information A reveals that the reference individual satisfies the predefined condition.

However, these two tests may be carried out at different stages of the enrollment phase, for example later. For example, step 104 could be implemented unconditionally, as could step 106. Generally speaking, it is ensured that at least one step from among applying the hash function, digitally signing and implementing the measures to communicate the signed enrollment hash is carried out only if the following conditions are met:

- the check 102 reveals that the individual to be enrolled and the reference individual match, and
- the analysis 104 reveals that the information satisfies the condition for accessing the site.

The access server 2 is not involved in the enrollment phase. b) Control phase It will be assumed that the control server 4 detects that a user of the client 3 requests access to the website 1 from any client device, which will be assumed to be the client 3 for greater simplicity. This situation is first detected by the access server 2, which sends the control server 4 a message indicating that the client device 3 is requesting access.

The control phase is then implemented.

The control phase aims to check whether a user has successfully completed the abovementioned enrollment phase. It is thus checked in depth whether this user satisfies the predefined condition that is required to access the website 1. It should be noted however that the control phase does not use an identity document.

With reference to FIG. 4, the control phase comprises the following steps.

In a preliminary step, the access server 2 redirects the client 3 to a page hosted by the control server 4. From this time onward, a direct dialog is established between the control server 4 and the client 3, preferably without going via the access server 2. Data may thereby be sent by the client 3 to the control server 4, without these data transiting via the site access server 2.

The control server 4 prompts the user of the client 3, via one or more appropriate messages, to turn on the camera of the client 3 and to position themselves in front of the camera.

In a step 200, the control server 4 receives a proof video V acquired by the camera of the client 3 and then transmitted to the control server 4 via the communication interface of the client 3.

In a step 202, the control server 4 applies a liveness test to the proof video V, in order to check for the presence of a living individual in the proof video V. Such a liveness test is known to those skilled in the art. This liveness test makes it possible in particular to avoid fraud consisting in deceiving the control server 4 by presenting a photo of someone else to the camera instead of a real face. The liveness test knows how to distinguish between a living individual and an individual depicted on a medium that is itself placed in the field of view of the camera (for example a photograph in paper format or displayed on a smartphone).

If the liveness test fails (no living individual detected in the video), then the control server 4 generates a result "NOK" indicating that the sender of the proof data does not have the right to access the site.

If the liveness test passes (a living individual is detected in the video), the control phase continues.

The control server 4 prompts the user of the client 3, via one or more appropriate messages, to provide the control server 4 with the signed enrollment hash that was delivered thereto at the end of the enrollment phase (where applicable in the form of a barcode), along with the enrollment image that they submitted in this enrollment phase.

Preferably, the control server 4 prompts the user of the client 3 to present the photograph that showed the individual U to be enrolled in front of the camera of the client 3, this photograph itself being shown in the enrollment image.

Assuming that the user of the client 3 has responded to the instructions from the control server 4, the control server 4, in a step 203, obtains a proof image I' showing a user U' to be inspected (see FIG. 5), for example by extracting it from the video V. Generally speaking, the user U' is supposed to correspond biometrically to the user U shown in the enrollment image in the enrollment phase. More specifically, the image I' is supposed to show the photograph presented in the enrollment phase, like the enrollment image. Thus, in a normal case, the image I' is supposed to correspond substantially to the enrollment image.

If, in step 203, the control server fails to obtain the proof image I', for example within a predefined time, then the control server 4 generates the result "NOK".

Step 203 may furthermore comprise or be followed by a check for a match between the living individual identified in step 202 and the individual to be inspected shown in the proof image I'. If the two individuals do not match, then the control server 4 generates the result "NOK".

Still assuming that the user of the client 3 has responded to the instructions from the control server 4, the control server, in a step 204, obtains an image showing a proof barcode CC, for example by extracting it from the video V. The proof barcode is supposed to be the barcode C representing the signed enrollment hash for the user of the client 3 in the enrollment phase.

If, in step 204, the control server fails to obtain the proof barcode CC, for example within a predefined time, then the control server 4 generates the result "NOK".

In a step 206, the control server recovers the binary word represented by the barcode CC, assuming that this binary word is a signed proof hash, denoted SH'.

At this stage of the control phase, the control server has obtained proof data comprising:

- the proof image I' showing the individual U' to be inspected, and a signed proof hash SH' (in any case, a binary word that the control server interprets as such a hash).

In a step 208, the control server 4 checks the signature of the signed proof hash, using the public key PK forming an asymmetric key pair with the private key SK. During this step 208, it is determined whether or not this signature has been produced by the private key. It is thus determined indirectly whether the signed proof hash SH' is an enrollment hash generated by the control server in an implementation of the enrollment phase.

If the signed proof hash has not been produced by the private key, the control server 4 generates the result NOK, indicating that the sender of the proof data does not have the right to access the site.

Moreover, in a step 210, the control server 4 applies the hash function F to the proof image I' (the same hash function as that used in the enrollment phase), so as to produce another proof hash H'. This therefore gives: H'=F(I').

Step 210 may be carried out before, after or during any of steps 203, 204, 206, 208.

In a step 212, the control server 4 checks for a match between the signed proof hash SH (which has, where applicable, been deduced from the proof barcode CC) and the other proof hash H' (which has been deduced from the proof image I' showing the user to be inspected).

It should be understood here that the match carried out in step 212 does not take into consideration the signature of the signed proof hash SH. H" will be used to denote the unsigned version of the signed proof hash SH. The proof hash H" may constitute one portion of SH (the signature constituting another portion of SH).

During step 212, a metric representative of a distance between the two proof hashes H' and H" is calculated, and this metric is compared to a threshold. There is a match between the two proof hashes H' and H" if and only if the metric representative of the distance is less than the predefined threshold.

The fact that a perceptual hash function F was used during the enrollment phase and then during step 210 is advantageous, since this allows a certain tolerance in the check for a match performed in step 212. It will thus be possible to conclude that there is a match between the proof hashes H' and H" when the images I and I' are similar but not necessarily strictly identical on the pixel level. The user of the client 3 is thus allowed to submit not exactly the same image I=I' in the enrollment and control phases, which is more practical for them. Such a match may in particular be observed when the images I and I' show one and the same photograph that is however positioned differently or illuminated differently.

If the proof hashes H' and H" do not match, the control server 4 generates the result NOK, indicating that the sender of the proof data does not have the right to access the site.

If the proof hashes H' and H" match, the control server 4 generates a result OK, indicating that a sender of the proof data has the right to access the site.

Ultimately, the result OK is obtained only if the following conditions are met:

- the signature check (carried out in step 208) reveals that the signed proof hash has been signed with the private key,
- the check for a match reveals that the proof hashes H' and H" match,
- optionally, it is observed that the living individual detected in the proof video V corresponds to the individual shown in the proof image I'.

The generated result of the inspection (OK or NOK, as the case may be) is then sent by the control server 4 to the access server 2, via the communication interface of the control server 4.

When the inspection result is OK, then the access server 2 accepts the request for access to the website 1 from the client 3. The client 3 therefore accesses the site 1.

When the inspection result is NOK, then the access server 2 refuses the request for access to the website 1 from the client 3. The access server 2 thus prevents the client 3 from accessing the site 1.

The control phase is triggered upon each new request for access to the website 1.

In this embodiment, it will be noted that the identity document (providing the information A for deducing whether the individual to whom this document relates meets the condition for accessing the website 1) is used only once, at enrollment, but is not used in the subsequent control phase.

Moreover, the data delivered to the user at the end of the enrollment phase do not make it possible to trace the enrollment data provided during the enrollment phase, in particular the enrollment image I, the reference image RI, and the information present on the identity document provided during the enrollment phase.

c) Variant of the Control Phase With Challenge-Response

FIG. 6 shows one variant of the control phase comprising additional steps that are implemented following step 212 of checking for a match between the hashes H' and H", when the control server concludes that these hashes H' and H" match. As will be seen hereinafter, this variant has the advantage of allowing the operations that are carried out to be audited.

In a step 214, the control server hashes a datum dependent on the signed proof hash SH' and on a variable value t. The result of this hashing is another hash $\alpha$, which will instead be called a fingerprint $\alpha$ hereinafter in order to distinguish this datum from the hashes discussed above resulting from applying the function F to an image. In this respect, it will be noted that the hash function G used in step 214 is not necessarily the function F.

The datum subjected to the hashing in step 214 may be a datum resulting from a concatenation between the signed proof hash SH' and the variable value. This then gives $\alpha$=G(SH'|t).

Taking into account the variable value in step 214 makes it possible to diversify the value of the fingerprint $\alpha$, thereby making it possible to better protect the control server 4 against replay attacks.

The variable is for example a temporal variable. The value t of the variable may then be or depend on a current date, or on information extracted from the current date (for example t is the current time, the current minute, the current second, etc.).

In a step 216, the control server 4 sends the fingerprint $\alpha$ to the access server 2.

The access server 2 generates a challenge datum $\beta$ based on the fingerprint $\alpha$ and returns the challenge datum to the control server 4.

Preferably, the challenge datum $\beta$ results from applying a verifiable random function (VRF for short) to the fingerprint $\alpha$. One example of a VRF able to be used is the one described in the document "Making NSEC5 Practical for DNSSEC" by Dimitrios Papadopoulos et al., which is accessible in particular via the link https://eprint.iacr.org/2017/099.pdf.

In a step 218, the control server receives the challenge datum β sent by the access server.

In a step 220, the control server checks whether or not the challenge datum β satisfies a predefined validity condition.

If the challenge datum satisfies the validity condition β, the control server implements a step 222 of digitally signing the challenge datum using a second private key, so as to produce a signed challenge datum Sβ. The second private key may be different from the private key SK used during the enrollment phase.

In a step 224, the control server sends the signed challenge datum Sβ to the access server 2, provided that the inspection result generated in step 212 is OK.

In order for the sending step 224 to be implemented, the following conditions must be met:

- the inspection result generated in step 212 is OK,
- the check on the proof attribute reveals that the proof attribute contains information that satisfies the condition for accessing the site,
- the signature check (carried out in step 208) reveals that the signed proof hash has been signed with the private key.

Next, the access server 2 checks the validity of the signed challenge datum Sβ using a second public key, the second private key and the second public key forming a second asymmetric key pair. If the signed challenge datum Sβ is found to be valid, the access server 2 accepts the site access request from the sender of the proof data (the client 3). If the signed challenge datum is found to be invalid, the access server refuses the site access request from the client 3.

In this variant embodiment, the method leads to a positive result taking the form of a datum Sβ that is more complex than a simple "OK". The additional steps of this variant have the advantage of allowing the method to be audited. Indeed, it is possible to check a posteriori whether a datum in the form of a datum Sβ actually results from the described calculations. Conversely, the variant shown in FIG. 3 is not able to be audited, because it is not possible to deduce the simple result "OK" that all of the previous steps, contributing to the safeguarding of the site, have indeed been implemented.

In FIG. 6, steps 214 et seq. are shown as all being implemented after step 212. However, this is not mandatory, since all steps preceding step 224 may be carried out upon receipt of the signed proof hash SH', without necessarily waiting for confirmation that H' and H" match.

3) Access Control Method (Second Embodiment)

A description will now be given of a method implemented by the control server 4 according to a second embodiment. In this second embodiment, the predefined access condition for accessing the site 1 is not examined in the enrollment phase, but in the control phase.

In the enrollment phase (see FIG. 7), step 104 is replaced by a step 105 of the processor of the control server 4 generating an enrollment attribute DA containing the information A. During step 105, the control server 4 extracts the information A located on the identity document as shown in the reference image RI and passes it on to the attribute DA, but does not specifically seek to determine whether the reference individual satisfies a predefined access condition on the basis of the information A.

Step 105 is implemented unconditionally, regardless of whether or not this information A satisfies the access condition. Since the attribute DA contains the information A, this attribute may appropriately be used later to determine whether or not the access condition is met by the enrolled user.

For example, when the access condition is an age condition, the attribute DA may contain a character string of the type "birthdate=A" (A here being the date of birth found on the identity document D in step 105).

Generally speaking, the enrollment attribute is marked using a marking key. This marking thus produces a marked enrollment attribute.

The marking may be a digital signature. In this case, the marked enrollment attribute is a signed enrollment attribute, just like the signed enrollment hash. It should be noted that these two signed elements may be signed with the private key SK discussed above (in other words, the marking key is the private key SK), either in two separate steps or in a single signing operation. As an alternative, these two elements are signed using two different keys.

As a variant, the marking may be an encryption. In this case, the marked enrollment attribute is an encrypted enrollment attribute.

The enrollment attribute may be a datum independent from the signed enrollment hash SH, or else may be included in the signed enrollment hash SH. In particular, the signed enrollment hash may result from a concatenation of the enrollment hash H, of the attribute DA and of the digital signature generated in step 108.

The marked enrollment attribute is delivered to the user 3, for example using the same techniques as for the signed enrollment hash SH.

As in the first embodiment, the implementation of some steps of the enrollment phase of this second embodiment are conditional on certain tests, but it does not matter when these tests are implemented. Generally speaking, it is ensured that at least one step from among generating the enrollment attribute, applying the hash function, digitally signing, marking and implementing the measures is carried out only if the individual to be enrolled and the reference individual match.

In the control phase (see FIG. 8), the control server 4 asks the user to provide it with the marked enrollment attribute delivered in the enrollment phase. Thus, in a step 201, the control server 4 receives a marked proof attribute DA' that is supposed to correspond to the enrollment attribute.

The control server 4 furthermore applies, to the marked proof attribute DA', a processing operation complementary to the marking carried out during the enrollment phase. This complementary processing operation makes it possible to deduce whether or not the marked proof attribute has been marked using the marking key. The complementary processing operation uses a key that forms an asymmetric key pair with the marking key. For example, when the marking key is the private key SK, the key used by the complementary processing operation is the public key PK.

When the marking is a digital signature, the complementary processing operation is a signature check.

When the marking is an encryption, the complementary processing operation is a decryption. In this second case, it may be deduced that the marking key has not been used to mark the proof attribute when the result of this decryption is illegible, that is to say it does not have an expected format.

The processing operation complementary to the marking may form part of the signature checking step 208, or else be carried out before or after.

During step 212, the control server 4 does not only check for a match between the proof hashes H' and H". During step 212, the control server 4 also checks, on the basis of the proof attribute DA', whether the information that this attribute DA' contains satisfies the condition for accessing the site 1 (after decryption thereof, where applicable).

The result OK is obtained in this embodiment only if the following conditions are met:

the complementary processing operation reveals that the marked proof attribute has been marked using the marking key, the check on the marked proof attribute reveals that the marked proof attribute contains information that satisfies the condition for accessing the site, the signature check (carried out in step 208) reveals that the signed proof hash has been signed with the private key, the check for a match reveals that the proof hashes H' and H" match, optionally, it is observed that the living individual detected in the proof video V corresponds to the individual shown in the proof image I'.

Of course, the control phase of the method according to the second embodiment may comprise the optional challenge-response steps discussed above in relation to FIG. 6. The data delivered to the user at the end of the enrollment phase do not make it possible to trace the enrollment data, other than the information A, provided during the enrollment phase, in particular the enrollment image I, the reference image RI, and other information present on the identity document provided during the enrollment phase.

4) Other Embodiments

Although the use of the barcodes C, CC is particularly advantageous in terms of practicality for the user, this use is not mandatory. The user to be enrolled may have the signed enrollment hash SH, and/or the enrollment attribute, delivered to them directly in the form of a digital file in the enrollment phase, without necessarily passing via a graphical representation.

In the embodiments illustrated in the figures, the control server 4 receives a video and the proof data are extracted from this video. This is not mandatory. The control server 4 may, as an alternative, prompt a user of the client 3 to upload the proof data through an appropriate menu.

It has been assumed up to now that the enrollment phase and the control phase are implemented by one and the same server (the control server 4). As a variant, it may be envisaged to entrust the enrollment phase to an enrollment server separate from the control server, and the control server implements only the control phase.

A description has also been given of embodiments in which the entity that checks the condition for accessing the site 1 (the control server 4) is separate from the entity that makes the decision to authorize or refuse access to the site 1 (the access server 2). These embodiments are advantageous because they make it possible to ensure that the administrators of the site 1 do not have access to the content of the identity document D. However, in other embodiments, the control server 4 and the access server 2 are one and the same server.

It has been assumed up to now that the site 1 is a website. The proposed method then seeks to control access to data. However, the above embodiments are also applicable to a physical site, in other words a secure area. In this alternative application, the method aims to control physical access to the secure area for an individual possessing the client 3; the function provided by the access server 2 is then that of deciding whether or not an individual has the right to physically access this secure area.

The invention claimed is:

1. A method for controlling access to a site, the method being computer-implemented and comprising:

an enrollment phase, comprising steps of:

obtaining enrollment data comprising:

an enrollment image showing an individual to be enrolled, and a reference image showing:

a photograph located on an identity document, the photograph showing a reference individual, and information located on the identity document and relating to the reference individual, checking for a match between the individual to be enrolled and the reference individual based on the enrollment image and on the reference image, analyzing the information shown in the reference image so as to determine whether or not the information satisfies a condition for accessing the site, applying a hash function to the enrollment image so as to produce an enrollment hash, digitally signing the enrollment hash using a private key, so as to produce a signed enrollment hash, and implementing measures with a view to communicating the signed enrollment hash to a sender of the enrollment data, wherein at least one step from among applying the hash function, digitally signing and implementing the measures is carried out only if the following conditions are met:

the check reveals that the individual to be enrolled and the reference individual match, and the analysis reveals that the information satisfies the condition for accessing the site, and a control phase, comprising steps of:

obtaining proof data comprising:

a proof image showing an individual to be inspected, and a signed proof hash, using a public key forming an asymmetric key pair with the private key, checking the signature of the signed proof hash, applying the hash function to the proof image so as to produce another proof hash, checking for a match between the signed proof hash and the other proof hash, and generating an inspection result indicating that:

a sender of the proof data has the right to access the site, only if the following conditions are met:

the signature check reveals that the signed proof hash has been signed with the private key, and the check for a match reveals that the signed proof hash and the other proof hash match, and otherwise, the sender of the proof data does not have the right to access the site.

2. A method for controlling access to a site, the method being computer-implemented and comprising:

an enrollment phase, comprising steps of:

obtaining enrollment data comprising:

an enrollment image showing an individual to be enrolled, and a reference image showing:

a photograph located on an identity document, the photograph showing a reference individual, and information located on the identity document and relating to the reference individual, checking for a match between the individual to be enrolled and the reference individual based on the enrollment image and on the reference image, generating an enrollment attribute that contains the information shown in the reference image, applying a hash function to the enrollment image so as to produce an enrollment hash, digitally signing the enrollment hash using a private key, so as to produce a signed enrollment hash, marking the enrollment attribute using a marking key, so as to produce a marked enrollment attribute, and implementing measures with a view to communicating the signed enrollment hash and the attribute to a sender of the enrollment data, wherein at least one step from among generating the enrollment attribute, applying the hash function, digitally signing, marking and implementing the measures is carried out only if the individual to be enrolled and the reference individual match, and a control phase, comprising steps of:

obtaining proof data comprising:

a proof image showing an individual to be inspected, a signed proof hash, and a marked proof attribute, using a public key forming an asymmetric key pair with the private key, checking the signature of the signed proof hash, applying, to the marked proof attribute, a processing operation complementary to the marking in order to deduce whether or not the marked proof attribute has been marked with the marking key, applying the hash function to the proof image so as to produce another proof hash, checking for a match between the signed proof hash and the other proof hash, checking the marked proof attribute so as to determine whether or not the marked proof attribute contains information that satisfies a condition for accessing the site, and generating an inspection result indicating that:

a sender of the proof data has the right to access the site, only if the following conditions are met:

the signature check reveals that the signed proof hash has been signed with the private key, the complementary processing operation reveals that the marked proof attribute has been marked using the marking key, the check on the marked proof attribute reveals that the marked proof attribute contains information that satisfies the condition for accessing the site, and the check for a match reveals that the signed proof hash and the other proof hash match, and otherwise, the sender of the proof data does not have the right to access the site.

3. The method as claimed in claim 2, wherein:

the marking is an encryption, and the complementary processing operation is a decryption, or the marking is a digital signature, and the complementary processing operation is a digital signature check.

4. The method as claimed in claim 2, wherein the hashing is perceptual hashing.

5. The method as claimed in claim 2, wherein the measures comprise generating an enrollment barcode representing the signed enrollment hash.

6. The method as claimed in claim 2, wherein the proof data comprise a proof video, and the control phase comprises the following steps:

checking for the presence of a living individual in the proof video, and if a living individual is present in the proof video, obtaining the proof image from the proof video.

7. The method as claimed in claim 6, further comprising:

checking for a match between the living individual and the individual to be inspected based on the proof image, wherein the generated inspection result indicates that the sender of the proof data does not have the right to access the site if the living individual and the individual to be inspected do not match.

8. The method as claimed in claim 6, wherein the control phase furthermore comprises a step of:

detecting a proof barcode representing the signed proof hash in the proof video.

9. The method as claimed in claim 2, wherein:

the control phase is implemented by a control server, and if the inspection result indicates that the sender of the proof data has the right to access the site, the inspection result is transmitted to a site access server separate from the control server, such that the site access server accepts a site access request from the sender of the proof data.

10. The method as claimed in claim 9, wherein the proof data are obtained by the control server without going via the access server.

11. The method as claimed in claim 9, wherein the control phase further comprises the following steps:

hashing a datum dependent on the signed proof hash and a variable value, so as to produce a fingerprint, sending the fingerprint to the site access server;

receiving a challenge datum generated by the site access server based on the fingerprint, determining whether or not the challenge datum satisfies a validity condition, if the challenge datum satisfies the validity condition, digitally signing the challenge datum using a second private key, so as to produce a signed challenge datum, and if the inspection result indicates that the sender of the proof data has the right to access the site, sending the signed challenge datum to the access server, the access server being configured to:

check the validity of the signed challenge datum using a second public key, the second private key and the second public key forming a second asymmetric key pair, and if the signed challenge datum is found to be valid, accepting a site access request from the sender of the proof data.

12. The method as claimed in claim 11, wherein the variable is a temporal variable.

13. The method as claimed in claim 11, wherein the access server is configured to generate the challenge datum by applying a verifiable random function to the fingerprint.

14. The method as claimed in claim 2, wherein the condition for accessing the site comprises an age condition.

15. A non-transitory computer-readable medium storing program code instructions for carrying out the steps of the method as claimed in claim 1 when the program is executed by at least one processor.

* * * * *